A. PERSSON.
DEMOUNTABLE WHEEL RIM MECHANISM.
APPLICATION FILED SEPT. 11, 1919.
1,430,253.
Patented Sept. 26, 1922.
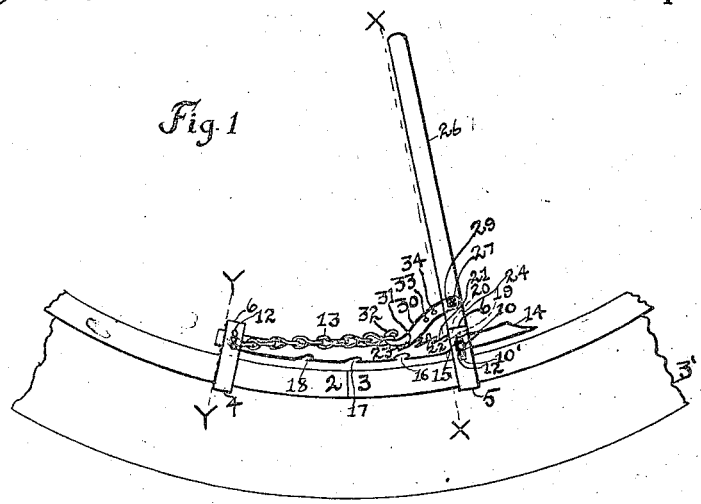
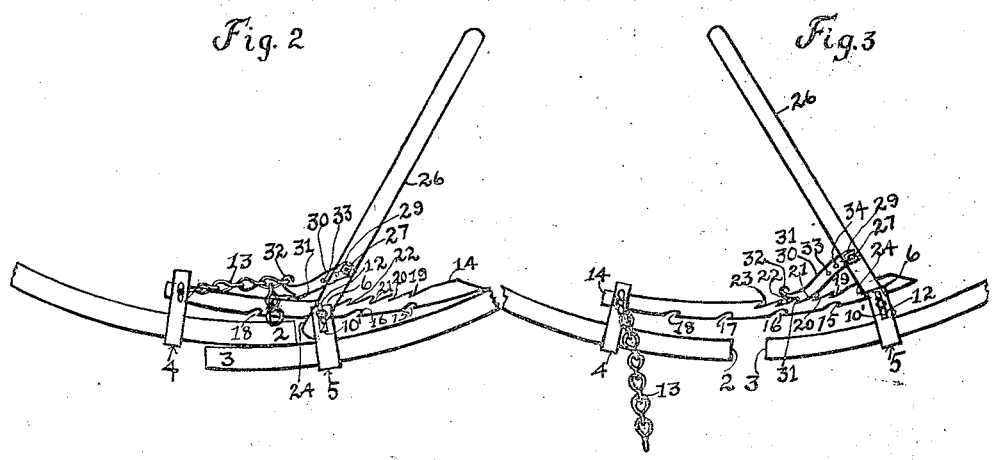
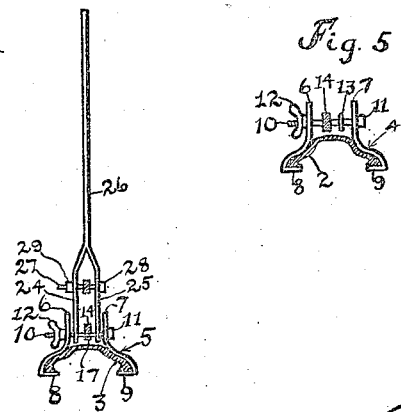
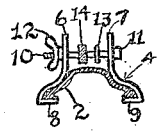
INVENTOR:
Anton Persson Patented Sept. 26, 1922.

1,430,253

UNITED STATES PATENT OFFICE.

ANTON PERSSON, OF CALGARY, ALBERTA, CANADA.

DEMOUNTABLE WHEEL-RIM MECHANISM.

Application filed September 11, 1919. Serial No. 323,061.

*To all whom it may concern:*

Be it known that I, ANTON PERSSON, a citizen of Canada, residing in the city of Calgary, Alberta, Canada, have invented certain new and useful Improvements in Demountable Wheel-Rim Mechanisms, of which the following is a specification.

My invention relates to mechanisms for contracting wheel rims to release the tire and has particular reference to automobile wheels and the like. The object of the invention is to provide in simple form a powerful and comparatively inexpensive mechanism for this purpose that is easily attached and operated. Another object of the present invention is to provide a rim-contracting mechanism which is also operable as a rim-expanding mechanism to force overlapping meeting ends of a rim into alinement.

With the above-named general objects in view my invention consists in the novel construction, combination and arrangement of parts, all as hereinafter described in detail, illustrated in the accompanying drawing and more particularly pointed out in the appended claim.

In the drawing—

Figure 1 is a section of wheel rim and tire with my invention applied thereto.

Figure 2 is a similar view omitting the tire, showing rim-contracting positions of the several parts.

Figure 3 is a similar view showing the rim-expanding operation of the device.

Figure 4 is a section taken substantially on the line X—X of Figure 1.

Figure 5 is a section taken substantially on the line Y—Y of Figure 1.

In the several views 2 and 3 represent the meeting ends of a demountable wheel-rim section and 3′ represents a section of tire on said rim. In my combination of contracting and expanding mechanism I provide a clamp 4 for the end 2 of the rim and a similar clamp 5 for the end 3. Each of these clamps consists of a pair of suitable formed members 6 and 7 made to conform approximately to the exterior contour of the rim and having inturned hooks or lugs 8 and 9 which are engaged with the edges of the rim adjacent to the tire. Each of the pairs of clamp-members 6 and 7 are drawn towards each other or clamped upon the rim by means of a bolt 10 engaging bolt holes through said members 6 and 7 and having a head 11 which engages the member 7 and a wing-nut 12 on the threaded end of the bolt which engages the member 6 whereby the nut may be tightened by hand. On the bolt 10 for the clamp 4 is anchored one end of a chain 13 and one end of a notched bar 14 in the lower edge of which are a suitable number of notches 15, 16, 17 and 18. The upper edge of said bar is formed with ratchet teeth 19, 20, 21, 22, and 23 said bar being pivotally mounted on the bolt 10 for the clamp 4. The notches 15 to 18 are, as indicated in Figures 1, 2 and 4 engageable with the bolt 10 for the clamp 5 to hold the successive take-ups or movements during the rim-contracting operation of the device. On the clamp 5 bolt 10 are fulcrumed fork members 24 and 25 of an operating lever 26. Through said members 24 and 25, above the bolt 10, passes another bolt —27— having a head 28 and a nut 29. On said bolt 27 is pivoted a pawl 30 having a spur or tooth 31 that is engageable with the teeth or notches 19 to 23, and having also a hook or eye 32 that may be engaged with any suitable link, or its equivalent, in the chain 13 or its equivalent for the purposes of the present invention. Additional holes 33 and 34, to be engaged by the bolt 27, provide adjustability for the pivoting of the pawl member 30 to vary the extent of its projection from the lever and the position of its spur 31 in relation to the ratchet teeth 19 to 23 and adapt its operation to various forms and sizes of rims.

Figures 2 and 3 show the two opposite modes of operation. From the position shown in Figure 1, (after first pressing the ends of the rims apart by hand, which is usually accomplished without much effort), the lever has been swung to the right until the notch 16 engaged the bolt 10 of the clamp 5, then returned to substantially its Figure 1 position to engage the hook 32 with a different link to shorten the chain connection, then swung to the right a second time to engage said bolt 10 with the next notch —17— as in Figure 2. It will be seen that the above-described mechanism affords a long range of contracting movement or overlapping of rim-ends, Figure 2 emphasizing this overlapping of rim-ends beyond normal requirements. It often happens, however, that an unusual amount of contracting of the rim must be made to free a tire.

In Figure 3 the expanding movement is shown, and here, too, the movement is emphasized by continuing it beyond requirements, or until the meeting ends of the rim are spaced apart. In case of a wooden rim contracted during a dry period until the tire is too large for it, this excess expanding movement may be utilized to tighten the rim against the tire and then filling the space between the ends with a suitable block or small rim section. This would in most cases serve to at least tide over a difficulty until more permanent repairs could be made by contracting the tire or substituting a smaller one. In Figure 3 as shown, the chain is released from the hook 32 for the purpose of a clearer illustration, but in any event is inoperative and the member 30 and its spur 32 are caused to exert a pushing force by engagement with one of the notches 19 to 23, upon the bar 14, the clamp 4 and the rim-end 2. Provision for a limited lateral movement of the bar 14 on the bolt 10 for the clamp 5 is made by elongated holes or rectangular slots 10' in the clamp members 6 and 7.

Having thus described my invention I claim as new and desire to secure by Letters Patent—

In a rim breaker a pair of clamps, a lever pivoted to one of the clamps, a toothed bar pivoted to the other clamp and having notches to engage the cross bolt of the first clamp, a pawl pivoted to the lever and engageable with the teeth of the bar and a hook on the pawl with which a flexible connection also pivoted to the second clamp may be adjustably connected.

In testimony whereof I have hereunto signed my name.

ANTON PERSSON.